United States Patent
Wilt et al.

(10) Patent No.: US 7,929,431 B2
(45) Date of Patent: Apr. 19, 2011

(54) PORT RATE SMOOTHING IN AN AVIONICS NETWORK

(75) Inventors: Nicholas J Wilt, Glendale, AZ (US); Scott Gray, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 440 days.

(21) Appl. No.: 11/687,927

(22) Filed: Mar. 19, 2007

(65) Prior Publication Data

US 2008/0232253 A1    Sep. 25, 2008

(51) Int. Cl.
*H04J 3/14* (2006.01)

(52) U.S. Cl. ............ 370/229; 370/230.1; 370/231; 370/235.1

(58) Field of Classification Search ........... 370/229–240
See application file for complete search history.

(56) References Cited

U.S. PATENT DOCUMENTS

| | | | |
|---|---|---|---|
| 5,506,841 A | 4/1996 | Sandquist | 370/60.1 |
| 6,141,344 A | 10/2000 | DeLong | 370/360 |
| 6,438,132 B1 * | 8/2002 | Vincent et al. | 370/395.42 |
| 6,832,347 B1 * | 12/2004 | Parrish | 714/51 |
| 7,000,026 B2 | 2/2006 | Beshai et al. | |
| 7,027,393 B1 * | 4/2006 | Cheriton | 370/230.1 |
| 7,072,295 B1 | 7/2006 | Benson et al. | |
| 2001/0036181 A1 * | 11/2001 | Rogers | 370/389 |
| 2004/0153542 A1 | 8/2004 | Saint Etienne et al. | |
| 2005/0220029 A1 | 10/2005 | Calluaud et al. | 370/241 |
| 2006/0062143 A1 | 3/2006 | Bibby et al. | |
| 2009/0073882 A1 * | 3/2009 | McAlpine et al. | 370/235 |
| 2009/0175168 A1 * | 7/2009 | Wadekar et al. | 370/235 |

FOREIGN PATENT DOCUMENTS

| | | |
|---|---|---|
| EP | 1 051 001 A2 | 8/2000 |
| GB | 2 293 720 A | 3/1996 |

OTHER PUBLICATIONS

European Search Report for 08102639.5-1249 dated Jul. 2, 2008.

* cited by examiner

*Primary Examiner* — Jason E Mattis
*Assistant Examiner* — Stephen J Clawson
(74) *Attorney, Agent, or Firm* — Fogg & Powers LLC

(57) ABSTRACT

A communication network is provided. The network includes a least one switch and a plurality of ports. Each port is in communication with the at least one switch. At least one of the ports is configured to introduce a time delay after each transmission of a frame based at least in part on a maximum transmission rate of the at least one port and its allocated transmission rate.

19 Claims, 5 Drawing Sheets

PORT RATE SMOOTHING IN AN AVIONICS NETWORK

BACKGROUND

In an avionics network, such as an ARNIC 664 network, the simultaneous arrival of transmitted packets at network switches can cause a problem. Accordingly, network switches have to be designed to handle large peak ingress loads. Large peak ingress loads will result even with the A664 specified Virtual Link (VL) Bandwidth Allocation Gap (BAG) limiting. This is because the BAG limits only on a VL basis and multiple VLs from multiple ports can arrive at the network switch ports simultaneously. Additionally, multiple different VLs can be transmitted with a minimum inter-frame gap, stacking up multiple VL messages from a single port. One effect on the switch is that larger internal memories are required to buffer the peak condition to minimize the possibility of data loss. Another effect is increased jitter of traffic through the switch which creates a large deterministic latency bound. With the next generation of network designs currently under consideration, the giga-bit speeds of the ports will compound these matters further such that latency and memory size will have even larger bounds.

For the reasons stated above and for other reasons stated below which will become apparent to those skilled in the art upon reading and understanding the present specification, there is a need in the art for a method of effectively and efficiently handling the simultaneous arrival of transmitted packets at a switch.

SUMMARY OF THE INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a communication network is provided. The network includes a least one switch and a plurality of ports. Each port is in communication with the at least one switch. At least one of the ports is configured to introduce a time delay after each transmission of a frame based at least in part on a maximum transmission rate of the at least one port.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention effectively simulate a lower bit-rate that is less than the physical capacity of a network to eliminate the possibility of data loss without having to use switches with large internal memories needed to buffer the data and reduces switch latency and jitter such that is it deterministically bounded. This "smoothing" is accomplished with embodiments that add a delay after each data frame transmission from an end system in the network to achieve a lower effective bit rate. This design allows for simplified switch designs to be used in the network, and enables a simple analysis to determine maximum latency and jitter within the network.

Figure 1:
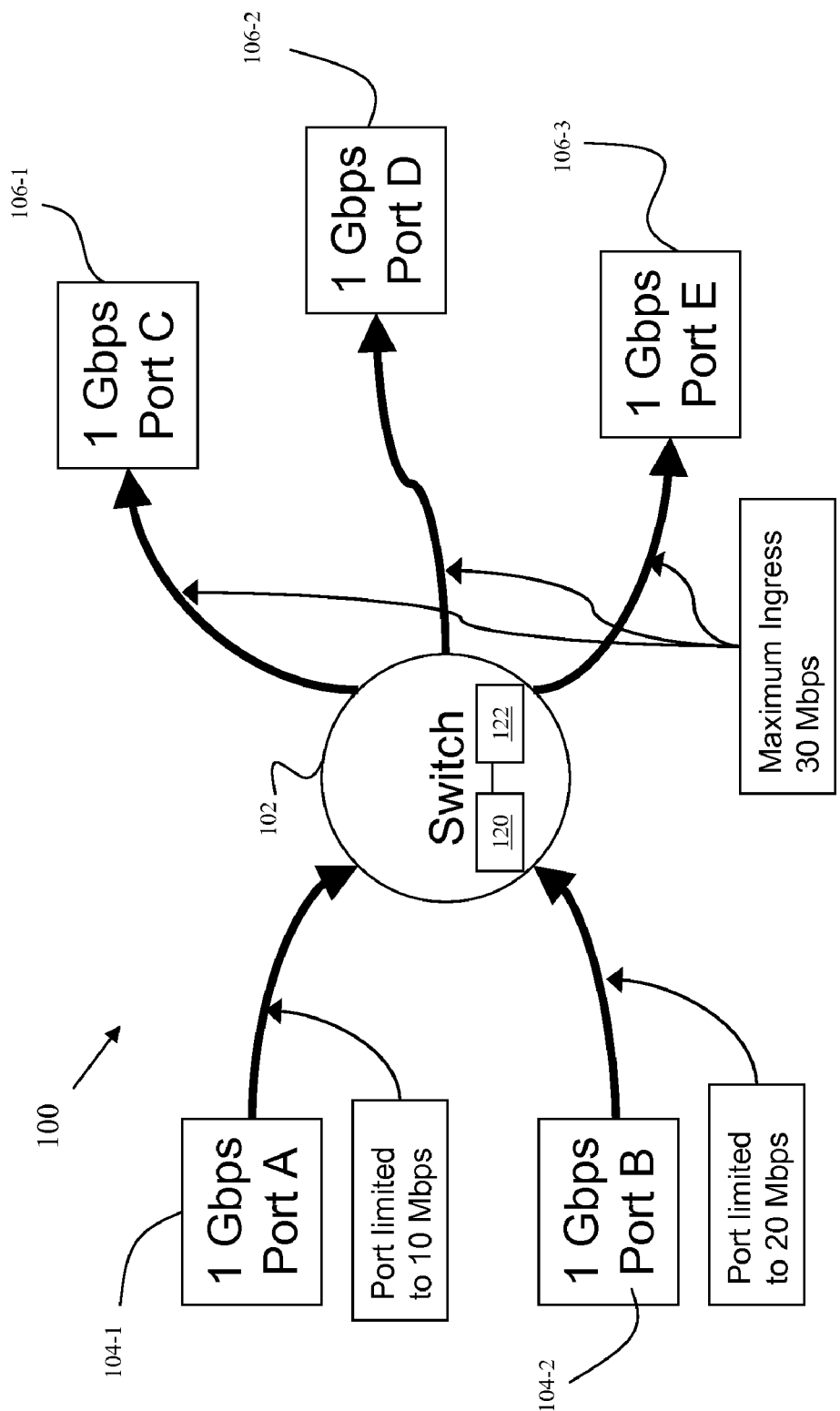
FIG. 1 is a block diagram of a communication network of one embodiment of the present invention.

Referring to FIG. 1 a network 100 of one embodiment of the present invention is illustrated. In one embodiment, the network is an ARNIC 664 network having avionic applications. As illustrated, the network includes transmission ports 104-1 and 104-2 that input data into switch 102 and receiving ports 106-1 through 106-3 that receive data from the switch 102. It is understood that in an actual implementation, all of these ports are full-duplex bi-directional and can both transmit and receive simultaneously. Additionally in one embodiment, each port would have a physical transmit and receive capability of 1 Gbps. FIG. 1 also gives examples of port limitation rates. In particular, in this example, port 104-1 has a port limitation rate of 10 Mbps, and port 104-2 has a port limitation rate of 20 Mbps. This limiting of ports 104-1 and 104-2 results in a maximum ingress rate to ports 106-1, 106-2, and 106-3 of 30 Mbps rather than the physical limit of 2 Gbps. In embodiments of the present invention, smoothing is achieved by limiting port transmission so that each receiving port cannot overflow. The transmission is smoothed by only allowing packets to egress at intervals that keep each port at or below its rate limit. Hence, each port in this embodiment is optimally smoothed. For example, if an 80 byte frame is transmitted from port 104-1, then another frame cannot be transmitted until (80*8*(1e9/1e7-1)) bit times have elapsed. This is called the inter-frame gap (IFG) time. The port rates are determined from an analysis of all data in the network and are monitored by a switch controller 120 in the switch 102 using a static table in a switch memory 122. Frames that arrive at the switch 102 that do not meet the required IFG time for that port are discarded in one embodiment.

In one embodiment the IFG time is calculated by Equation 1:

$$\text{Frame Transmit Time} \times \left(\frac{\text{Port Maximum Bandwidth}}{\text{Port Bandwidth Allocated}} - 1\right) \quad \text{Equation 1}$$

Figure 2:
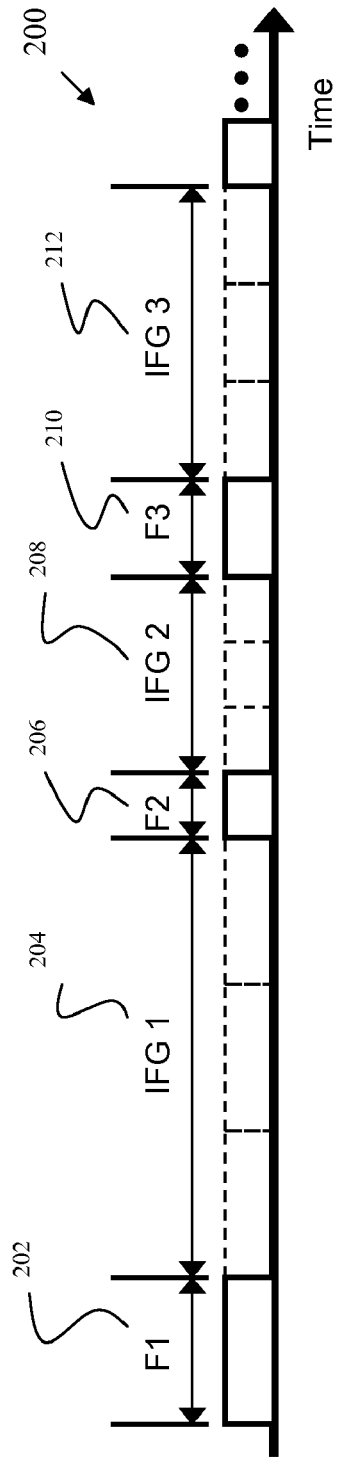
FIG. 2 is an illustration of a transmission from a port of one embodiment of the present invention.

FIG. 2 illustrates a port rate smoothing 200 using the IFG time of Equation 1. In this example, the port is transmitting at ¼ a maximum bandwidth. A first frame F1 202 egresses the port. A first IFG time IFG 1 204 is then determined. As illustrated, IFG 1 204 takes three times the time to transmit as F1 202. A second frame F2 206 is then allowed to egress the port. As illustrated, an IFG 2 208 is determined which takes three times the time to transmit as F2 206. A third frame F3 210 is then allowed to transmit. An IFG 3 212 is determined and as illustrated takes three times the time to transmit as F3 210. This sequence repeats for all the frames transmitted. As stated above, the maximum aggregate bandwidth used is ¼ the maximum bandwidth of the port in this example.

Figure 3:
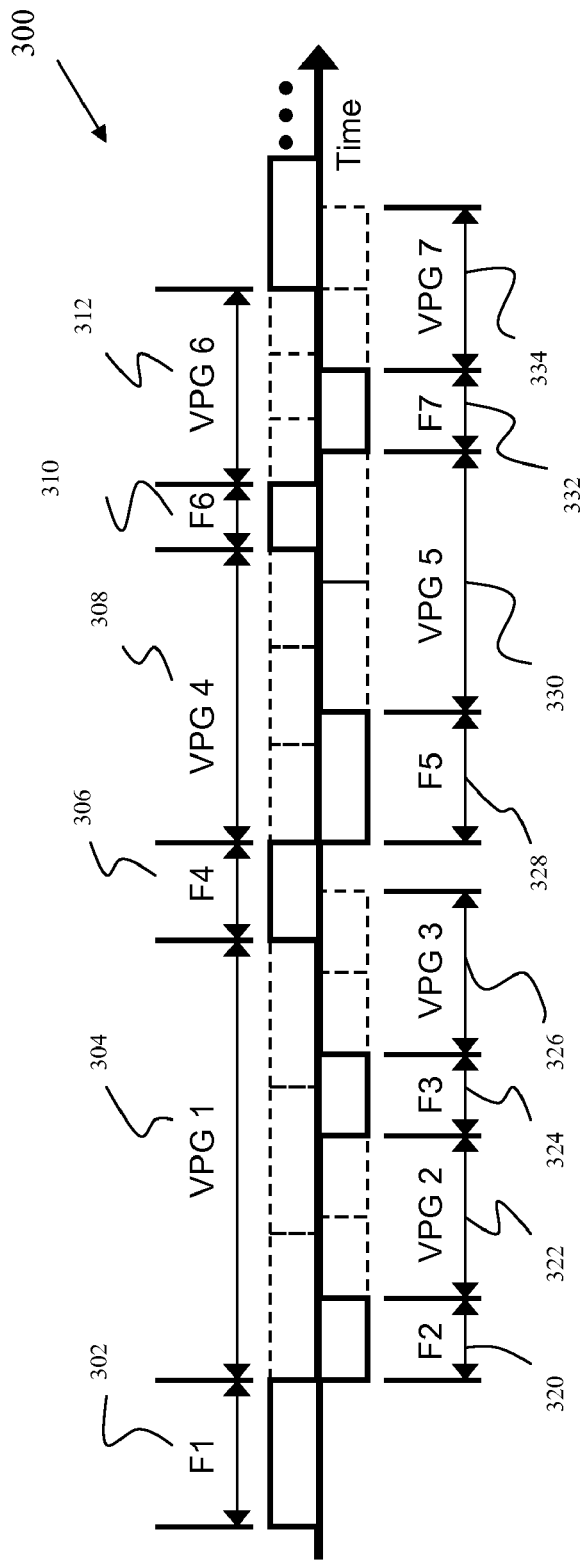
FIG. 3 is an illustration of a transmission from a port with virtual ports of one embodiment of one invention.

Referring to FIG. 3, another example of port rate smoothing 300 of a single port transmitting two virtual ports using Equation 1 is illustrated. In this example, one of the virtual ports is transmitting at ¼ the maximum bandwidth and the other is transmitting at ⅓ the maximum bandwidth. The first virtual port transmitting at ¼ the maximum bandwidth is represented by the first frame F1 302, the fourth frame F4 306 and the sixth frame F6 310. The second virtual port transmitting at ⅓ the maximum bandwidth is represented by the second frame F2 320, the third frame F3 324, the fifth frame F5 328 and the seventh frame F7 332. As illustrated in FIG. 3, F1 302 is first egresses from the port. A first virtual port gap (VPG), VPG 1 304 is determined via Equation 1. As illustrated, VPG 1 304 takes 3 times the time to transmit than F1 302. This sequence continues as illustrated with F4 306 and F6 310 and their associated delays VPG 4 308 and VPG 6 312

F2 320 egresses immediately after F1 302 since it belongs to a different virtual port. Since F2 320 transmits at ⅓ the maximum bandwidth, VPG 2 322 takes 2 times the time to transmit as F2 320 pursuant to Equation 1. This sequences continues with F3 324, F5 328 and F7 332 and their respective delays VPG 3 326, VPG 5 330 and VPG 7 334. Moreover, the sequence for both virtual ports continues as illustrated with a maximum aggregate bandwidth used being ¼ plus ⅓ the maximum bandwidth of the port.

In one embodiment with virtual ports, when a first virtual port is available for transmission but another frame in a second virtual port has not completed its transmission, transmission of the frame in the first port will be delayed until the transmission of the frame in the second port has been completed. This is illustrated in FIG. 3 in relation to F5 328. F5 328 is ready to transmit upon completion of delay VPG 3 326, however, F4 306 is still transmitting at that point. Accordingly, in this embodiment, the transmission of F5 328 is further delayed until F4 306 is complete. In the embodiment of FIG. 3 with virtual ports, multiple smoothing rates can occur as illustrated. This can be advantageous for data items like data loading file transfer. This would allow this type of data to have a higher transfer rate than that allowed for other system data.

Figure 4:
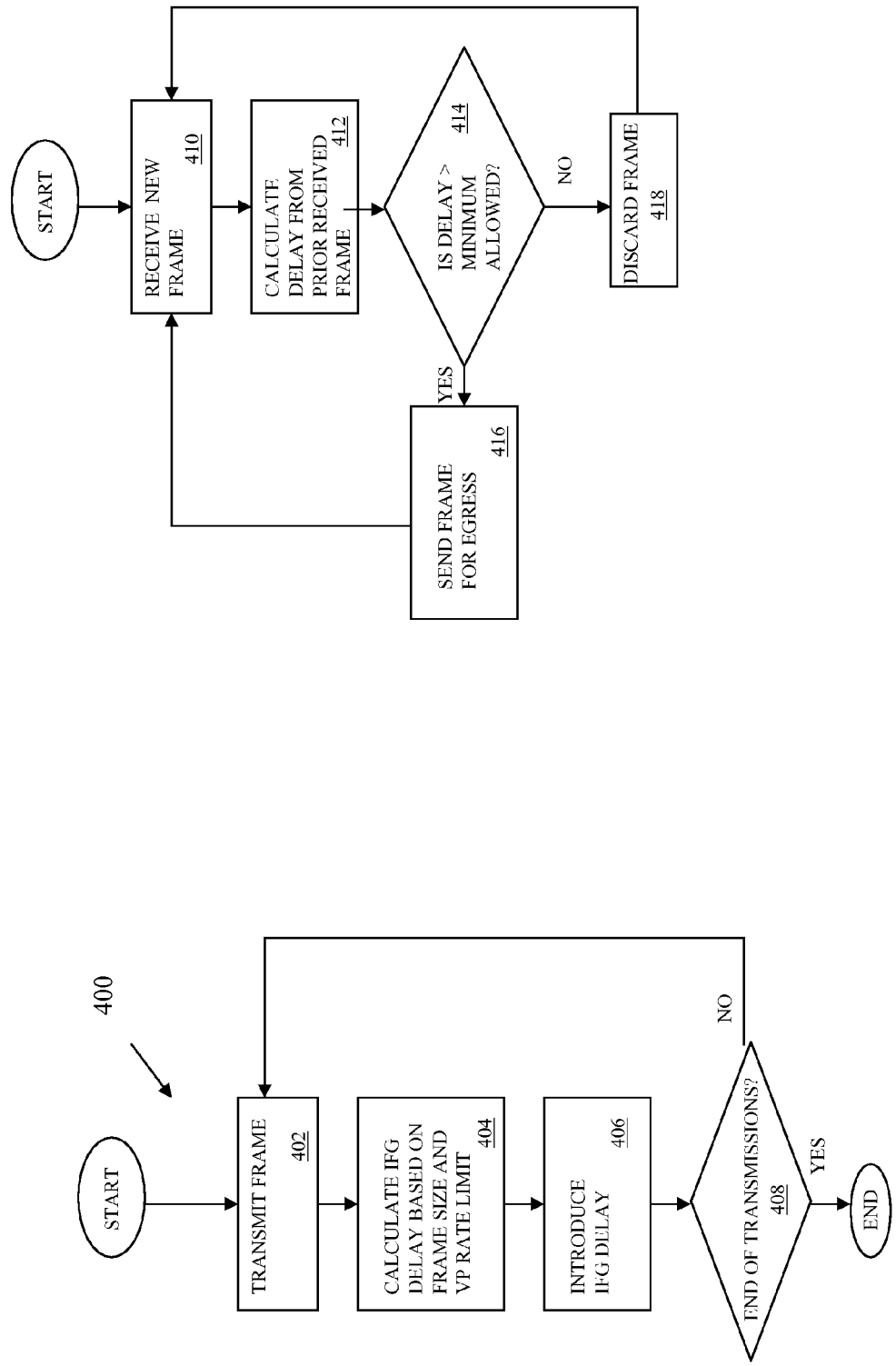
FIG. 4a is an end system rate smoothing flow diagram of one embodiment of the present invention.
FIG. 4b is a switch port rate checking flow diagram of one embodiment of the present invention.

FIG. 4a illustrates a frame transmit rate flow diagram 400 of an end system of one embodiment. An end system is generally referred to as a port. As illustrated, the end system transmits a frame (402). After the frame has been transmitted a delay is calculated (404). In embodiments, the delay is based on at least one of the port's maximum bandwidth and the port's bandwidth allocation as illustrated in Equation 1. Once the delay has been introduced (406), if the transmissions from the end system at this time are not complete (408), the process continues at (402) where another frame is transmitted. In one embodiment illustrated in flow diagram 4b, the transmitted frame is received at a switch (410) and the delay is monitored (412). It is then determined if the delay is correct (414). In one embodiment this is done by comparing the delay with a stored transmit rate limit in a static table. If the delay is not correct (414), the frame associated with the delay is discarded (418). If the delay is correct (414), the frame is forwarded for egress (416). The process continues with each new frame received.

Figure 5:
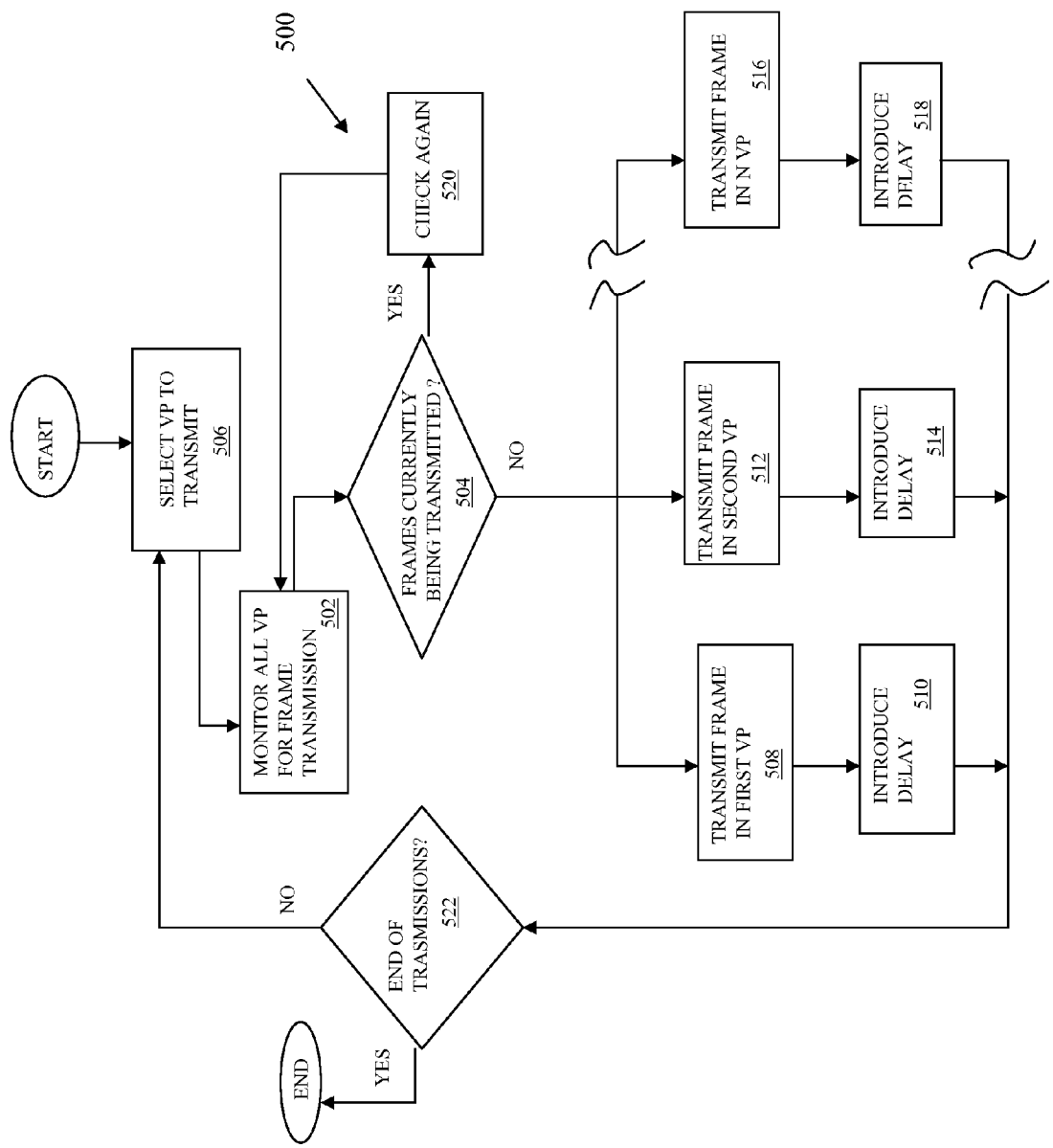
FIG. 5 is frame transmit rate flow diagram of another embodiment of the present invention.

FIG. 5 illustrates another frame transmit rate flow diagram 500 at an end system with multiple virtual ports (VP) of one embodiment. In this embodiment, the process starts by selecting a VP at the port to transmit (506). As illustrated, any one of the VPs indicated at (508), (512) and (516) could be selected to transmit a frame. Before the selected VP is permitted to transmit, all VPs are monitored for frame transmission (502).

It is then determined if any of the VPs are currently transmitting a frame (504). If one of the VPs is currently transmitting (504), that VP is continued to be checked (520) until the transmission is complete. Once it is determined that no VPs are transmitting (504), the selected VP is allowed to transmit (508), (512) or (516). Once the selected VP has transmitted the frame, a delay is introduced in the related VP (510), (514) or (518). The delays (510), (514) or (518) are based as described above. It is then determined if it is the end of transmissions for all of the VPs (522). If it is the end of transmissions at the port (522), the process ends. If it is not the end of transmissions (522), all VPs are monitored for frame transmissions. As illustrated in the embodiment of FIG. 3, after the transmission of a first frame in a first VP, the transmission of a second frame in a second VP can occur before the delay time in the first VP is complete. Hence, selecting a next VP to transmit at a port 506 can be done before a delay (510), (514), (518) is complete.

Figure 6:
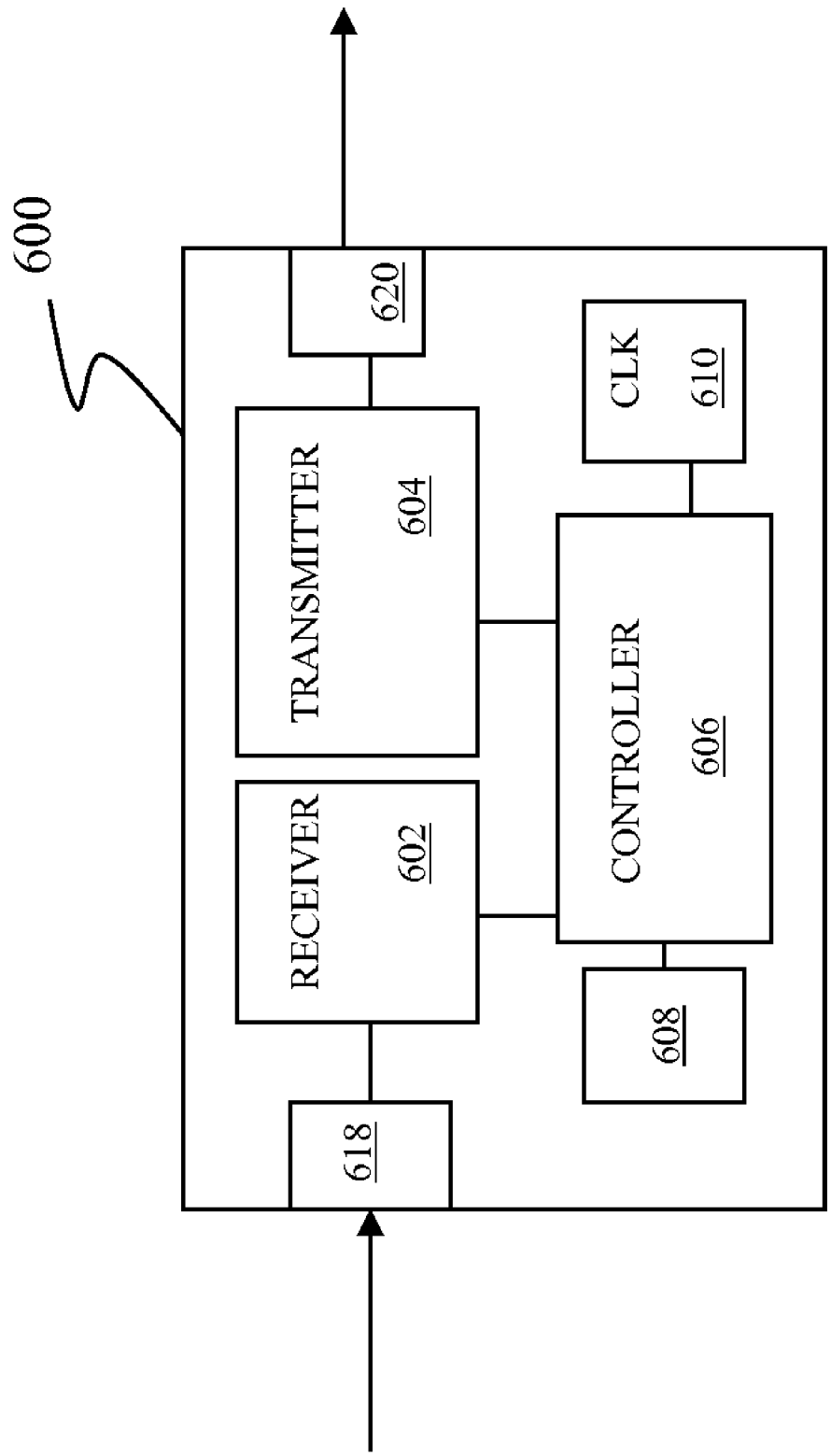
FIG. 6 is a block diagram of an end system of one embodiment of the present invention.

Referring to FIG. 6, a block diagram of an end system 600 (or generally a port 600) of one embodiment is illustrated. As illustrated, this embodiment of an end system 600 includes a receiver 602, a transmitter 604, a port controller 606, a port memory 608, a clock 610, an ingress port 618 and an egress port 620. The port controller 606 in embodiments provide various functions such as processing received signals, determining inter-frame gap (IFG) times, determining virtual port gap (VPG) times and controlling the transmission of signals by the transmitter 604. The port memory 608 is used to store instructions and information relating to the timing of the transmission of signals including equations used to determine gap times. The clock 610 is used to time delays determined by the gap times. The egress port 620 provides a communication link to a respective switch.

Generally, the methods and techniques used by ports and switches in embodiments of the present invention may be implemented in digital electronic circuitry, or with a programmable processor (for example, a special-purpose processor or a general-purpose processor such as a computer) firmware, software, or in combinations of them generally defined as modules. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A communication network, the network comprising:
at least one switch, including
a switch memory including a switch static table, and
a switch controller configured to monitor delays based at least in part on the switch static table in the switch memory; and
a plurality of ports, each port in communication with the at least one switch, wherein each of the plurality of ports includes a port static table stored in a port memory associated with one of the plurality of ports that defines a predetermined allocation of a transmission rate for the associated one of the plurality of ports; and
wherein each of the plurality of ports is configured to introduce an inter-frame gap (IFG) time delay between a first transmitted frame and a second transmitted frame, wherein the IFG time delay is based at least in part on the port static table and on a transmission time of the frame, wherein the switch enforces the transmission rate for each of the plurality of ports using the switch static table;
wherein inter-frame gap (IFG) time delay is determined by performing a calculation equivalent to dividing a port maximum bandwidth by a port bandwidth allocation and then subtracting one, then multiplying by the transit time of the preceding frame.

2. The network of claim 1, wherein the at least one port further comprises:
a transmitter configured to transmit frames;
a clock; and
a port controller configured to control the transmission of frames from the transmitter, the port controller using the clock to track a passing time for the time delay.

3. The network of claim 2, wherein the at least one port further comprises:
a port memory to store the port static table, the port memory in communication with the port controller; and
a receiver to receive signals, the receiver in communication with the port controller.

4. The network of claim 1, wherein at least two of the plurality of ports have different maximum transmission rates.

5. The network of claim 1, wherein the at least one port includes a plurality of virtual ports.

6. The network of claim 5, wherein at least one port introduces a delay after each frame transmitted in each of virtual ports.

7. The network of claim 1, wherein the switch is further configured to discard transmissions whose delays do not meet the delays in the switch static table.

8. The network of claim 1, wherein the IFG time delay is determined using the equation $$\text{Frame Transmit Time} \times \left( \frac{\text{Port Maximum Bandwidth}}{\text{Port Bandwidth Allocated}} - 1 \right).$$

9. A method of port rate smoothing in a network, the method comprising:
monitoring a port rate of a port in the network based at least in part on a switch static table;
introducing delays of an inter-frame gap (IFG) time after the transmission of each frame by the port, wherein each delay is based at least in part on a transit time of a preceding frame and a port static table that defines a predetermined allocation of a transmission rate for the port; and
determining the delay of the IFG time using a calculation equivalent to dividing a port maximum bandwidth by a port bandwidth allocation and then subtracting one, then multiplying by the transit time of the preceding frame.

10. The method of claim 9, further comprising:
determining the delay of the IFG time using the equation $$\text{Frame Transmit Time} \times \left( \frac{\text{Port Maximum Bandwidth}}{\text{Port Bandwidth Allocated}} - 1 \right).$$

11. The method of claim 9, further comprising:
monitoring all virtual ports at the port for frame transmissions; and
when a first virtual port is transmitting a first frame, delaying the transmission of a second frame at a second virtual port until the transmission of the first frame is complete.

12. The method of claim 9, further comprising:
monitoring the delays in the transmission; and
discarding transmissions with delays not of the IFG time.

13. The method of claim 12, further comprising:
comparing monitored delays with delays in the switch static table.

14. A method of port rate smoothing in a network, the method comprising:
transmitting a first frame from a port in the network at a first time;
monitoring transmissions from the port based at least in part on a switch static table;
determining a first gap time based at least in part on a frame transit time of the first frame and a predetermined allocation of a transmission rate for the port stored in a port memory;
introducing a delay in the transmission of the determined first gap time; and
transmitting a second frame from the port after the delay;
wherein determining the first gap time further comprises using a calculation equivalent to dividing a port maximum bandwidth by a port bandwidth allocation and then subtracting one, then multiplying by the transit time of the preceding frame.

15. The method of claim 14, further comprising:
determining a second gap time based at least in part on a frame time of the second frame, and
introducing a delay in the transmission of the determined second gap time.

16. The method of claim 14, wherein determining the first gap time further comprises
using the equation $$\text{Frame Transmit Time} \times \left( \frac{\text{Port Maximum Bandwidth}}{\text{Port Bandwidth Allocated}} - 1 \right).$$

17. The method of claim 14, wherein the transmitted first frame and the second transmitted frame is from a first virtual port (VP) of the port, the method further comprising:
transmitting a third frame from a second VP upon completion of the transmission of the first frame.

18. The method of claim 17, further comprising:
determining a third gap time based at least in part on a frame transit time of the third frame;
introducing a delay in the transmission of the determined third gap time; and
transmitting a fourth frame from the second VP after the delay.

19. The method of claim 14, further comprising:
determining if gap time delays are correct for a given frame; and
when the gap time delays are not correct, discarding the associated frame.

* * * * *